Nov. 7, 1950 J. L. JESSUP 2,528,753
INDEX HEAD FOR ROTARY SPINDLES
Filed Feb. 24, 1949 3 Sheets-Sheet 1

INVENTOR.
James L. Jessup.
BY
Barnes, Dickey & Pierce.
ATTORNEYS.

Nov. 7, 1950     J. L. JESSUP     2,528,753
INDEX HEAD FOR ROTARY SPINDLES

Filed Feb. 24, 1949     3 Sheets-Sheet 2

INVENTOR.
James L. Jessup.
BY
Harness, Dickey & Pierce
ATTORNEYS.

Nov. 7, 1950

J. L. JESSUP 2,528,753

INDEX HEAD FOR ROTARY SPINDLES

Filed Feb. 24, 1949

INVENTOR.
James L. Jessup.
BY
Harness, Dickey & Pierce
ATTORNEYS.

Patented Nov. 7, 1950

2,528,753

UNITED STATES PATENT OFFICE 2,528,753

INDEX HEAD FOR ROTARY SPINDLES

James L. Jessup, Detroit, Mich., assignor to Colonial Broach Company, Warren Township, Mich., a corporation of Delaware Application February 24, 1949, Serial No. 78,212

4 Claims. (Cl. 51—216)

This invention relates generally to an improved rotating spindle type index head for grinding machines or the like and more particularly to an index head having particular utility for spline grinding operations.

There is not, at the present time, a satisfactory and inexpensive rotating spindle type index head for grinding machines. One of the present practices in the construction of such heads is to couple together the rotating spindle, which is driven by the machine lead bar, with the indexing mechanism, which includes an indexing plate and a detent coupling which connects the plate to the rotating spindle, so that the indexing plate rotates with the spindle. With this type of construction, the holes in the index plate must be very accurately located and formed. This type of plate is of course, expensive because it must be ground and checked on optical or sine bar type index heads.

The use of an expensive index plate has been eliminated on index heads of the nonrotatable spindle type, wherein a standard inexpensive index plate is used in conjunction with reduction gearing between the indexing mechanism and the nonrotating spindle. With this arrangement the reduction gearing eliminates the need for very accurately located and formed holes in the index plate and a standard plate can be used. However, this type of head cannot be used for helical spline grinding operations.

The use of reduction gearing between the indexing mechanism and the spindle has also been employed with rotating spindle type heads. However, here again it is necessary to drive the spindle through the indexing mechanism, and as a result of the reduction gearing the index plate itself has to rotate from thirty to eighty revolutions for each revolution of the spindle. While this type of mechanism is satisfactory for milling machines and the like, where the rate of feed is very slow and only one pass of the working tool is required for a complete cut, it is not satisfactory for grinding machines, where the wheel makes a large number of rapid strokes over the work. The use of such a mechanism on grinding machines would wear out the index mechanism in a relatively short period of time. Furthermore, when the spindle is driven through the indexing mechanism, the plate cannot be indexed while the spindle is rotating, so that the rolling of a workpiece to finish, for example, wide cylindrical surfaces, such as between helical teeth, cannot be accomplished.

It is an object of this invention to provide a rotating spindle type index head in which a standard inexpensive index plate may be used, thus reducing the cost of the machine and the replacement of parts therefor.

It is a further object of this invention to provide a rotating spindle type index head, of the aforementioned type, in which the rotating spindle may be driven by the machine independently of the indexing mechanism, and in which the indexing mechanism can rotate the spindle relative to its driving mechanism.

It is a further object of this invention to provide a rotating spindle type index head, of the aforementioned type, in which reduction gearing is employed for connecting the indexing mechanism to the rotating spindle, so that a standard indexing plate may be used, and the necessity of using a highly accurate and expensive plate is eliminated.

It is a further object of this invention to provide in an index head of the aforementioned type, an improved differential gearing arrangement, which interconnects the rotating spindle, indexing mechanism and spindle driving mechanism in such a manner that the spindle can be driven by its driving mechanism independently of the indexing mechanism and the indexing mechanism can rotate the spindle relative to the driving mechanism.

It is a further object of this invention to provide an improved arrangement for eliminating backlash in the aforementioned differential gearing arrangement.

It is a further object of this invention to provide a rotating spindle type index head, of the aforementioned type, in which the index plate is always stationary, and thus avoids confusion on the part of the operator in the indexing operation.

It is a still further object of this invention to provide generally an improved rotating spindle type index head adapted primarily for use in grinding machines, which is relatively inexpensive to manufacture, and especially durable and efficient in operation.

Other objects of this invention will become apparent from the following detailed description taken in conjunction with the accompanying drawings in which.

Figure 1:
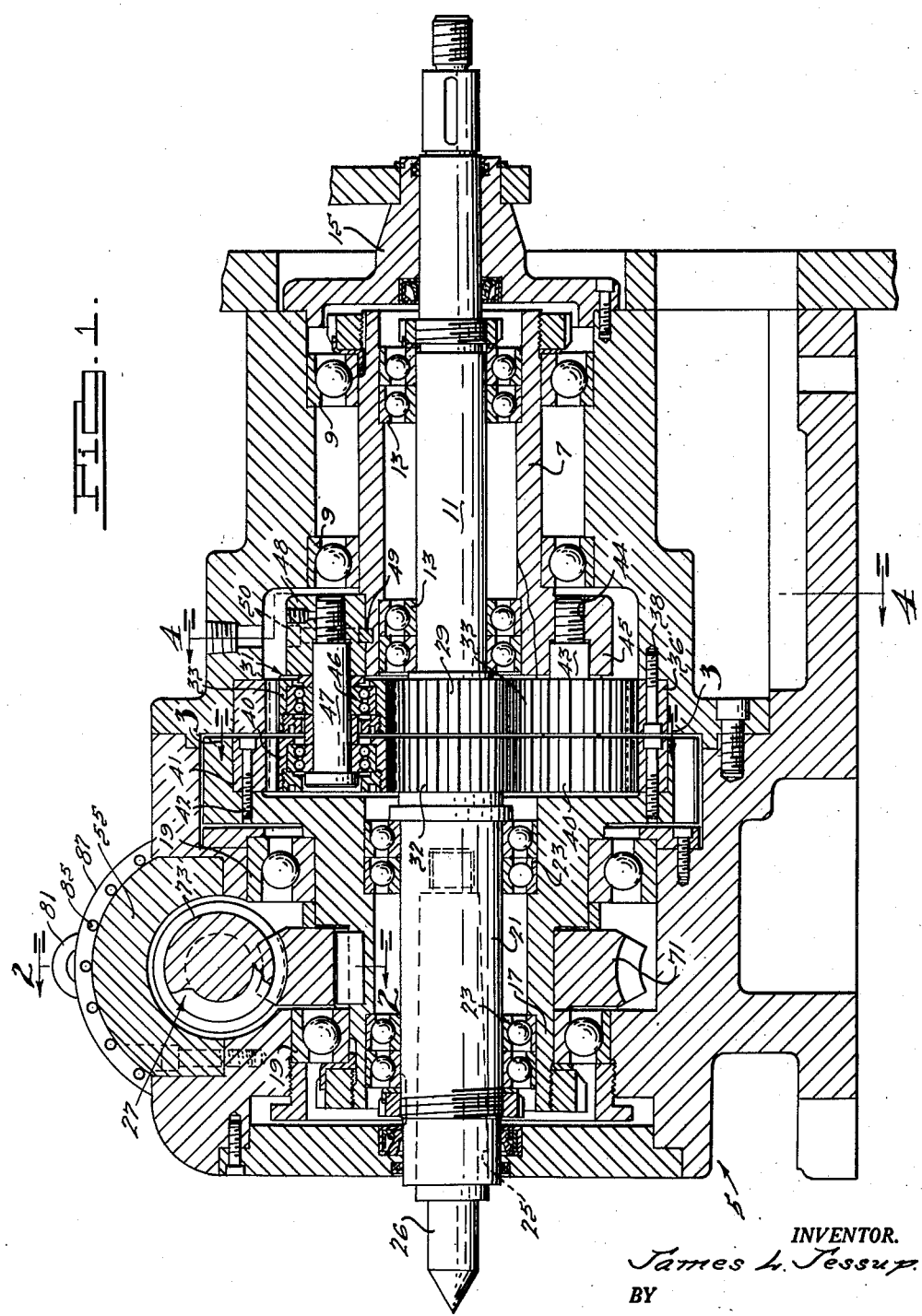
Figure 1 is a longitudinal sectional view of the index head of this invention.
Figure 2:
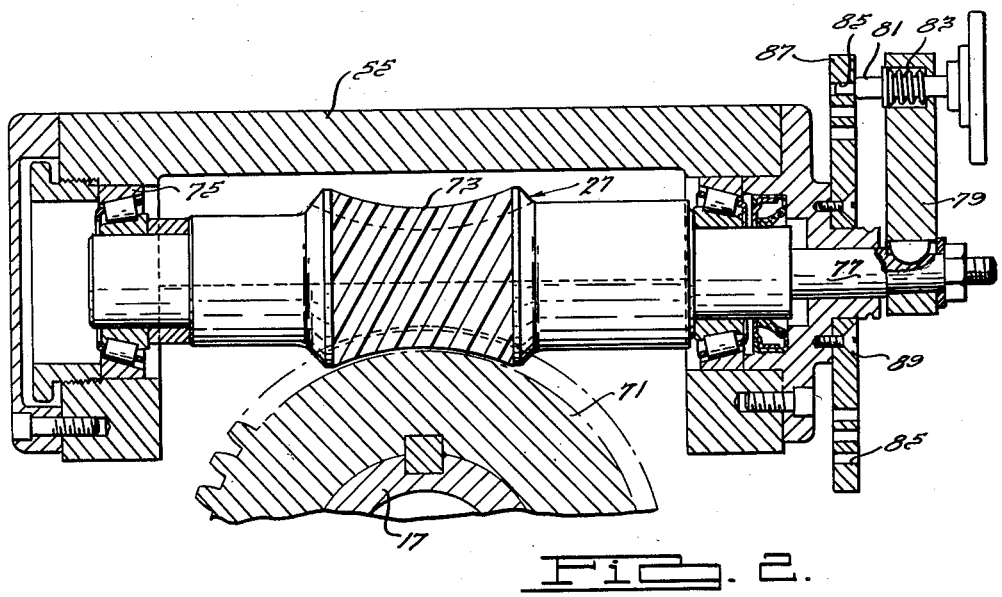
Fig. 2 is a sectional view of the structure illustrated in Fig. 1 taken along the line 2—2 thereof.
Figure 3:
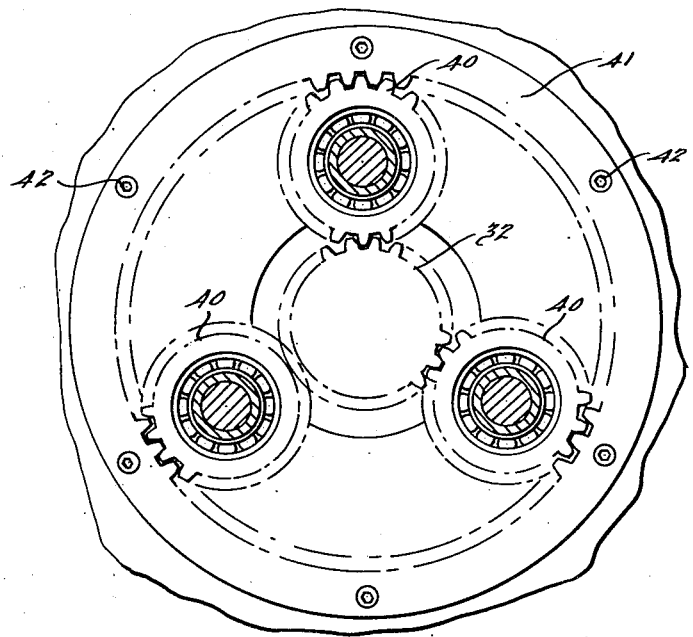
Fig. 3 is a sectional view of the structure illustrated in Fig. 1 taken along the line 3—3 thereof; and, Fig. 4 is a sectional view of the structure illustrated in Fig. 1 taken along the line 4—4 thereof.

Referring now to the drawings, it will be seen that the index head of this invention includes a housing 5 which is adapted to be mounted on the table of a suitable grinding machine or the like such as the machine illustrated and described in detail in applicant's copending application relating to Improvements in Helical Spline Grinding Machine, Serial No. 78,211, filed February 24, 1949. A sleeve 7 is rotatably supported in the rear portion of the housing 5 by means of bearings 9. A drive shaft 11 is rotatably supported in the sleeve 7 by means of suitable roller bearings 13. The rear portion of the drive shaft 11 projects through an end cap 15, which is connected to the housing 5, and is adapted to be connected through suitable gearing or the like to the lead bar of a machine such as shown in the aforementioned copending application.

A sleeve 17 is rotatably supported in the front portion of the housing 5 in coaxial relationship to the sleeve 7, by means of suitable bearings 19. A spindle 21 is rotatably supported in the sleeve 17 by means of suitable bearings 23. The front end of the spindle 21 is recessed at 25 to receive a conventional spindle center 26. An indexing mechanism 27, which will be hereinafter described in detail, is supported in the housing for indexing the spindle 21 relative to the drive shaft 11. The spindle, drive shaft and indexing mechanism are interconnected by means of differential gearing. The differential gearing may be of any suitable type, such as a single set of planetary gearing, if the gear ratio is of no consequence, but the arrangement illustrated is preferred in order to provide a one to one gear ratio between the spindle 21 and drive shaft 11. In the arrangement shown, the spindle 21 and the drive shaft 11 are disposed in an end to end aligned relationship and the forward end of the drive shaft 11 carries a sun gear 29 of a planetary differential gearing 31. The rear end of the spindle 21 carries a similar sun gear 32, which is disposed adjacent to the gear 29. The sun gear 29 meshes with three rotatably supported, circumferentially spaced planetary gears 33.

The planetary gears 33 mesh with a ring gear 36, which in turn is connected to the housing 5 by any suitable means such as cap screws 38. The planetary gears 33 will, therefore, roll around the ring gear 36, when driven by the sun gear 29.

The sun gear 32, which is carried on the end of the rotatable spindle 21, meshes with three circumferentially spaced planetary gears 40, each of which is disposed adjacent to and in alignment with one of the planetary gears 33. The planetary gears 40 mesh with a ring gear 41, which is connected to the sleeve 17 by any suitable means, such as cap screws 42.

Figure 4:
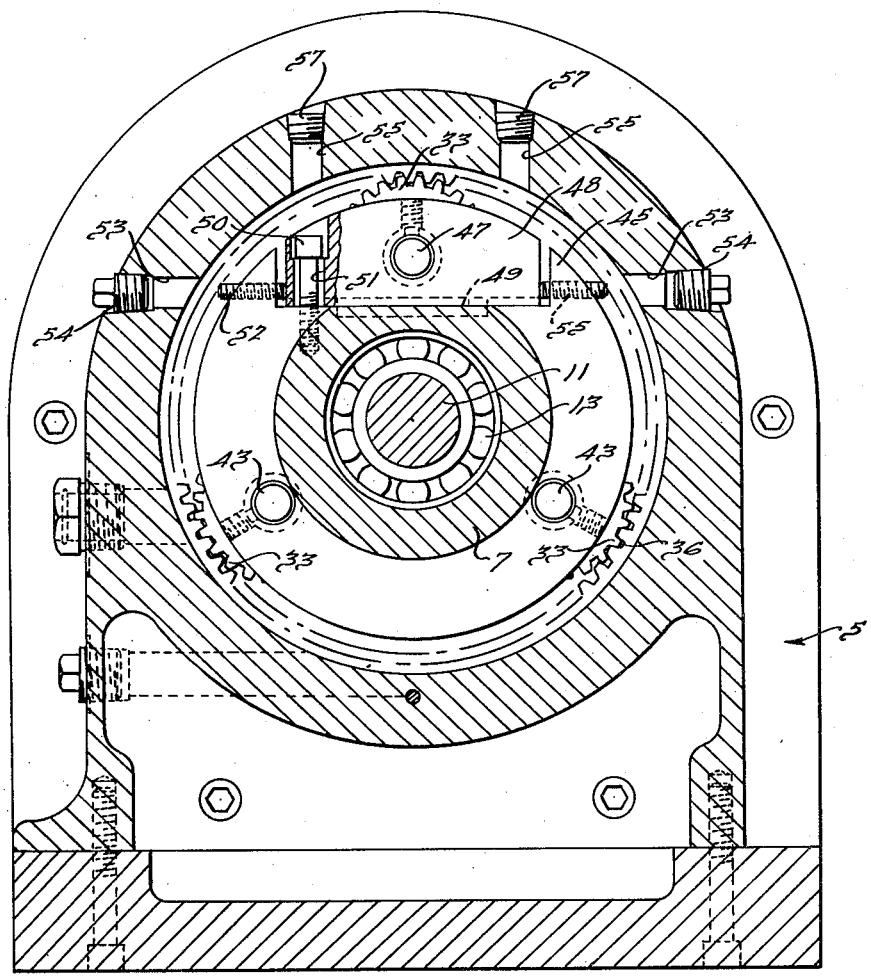

Two pairs of the adjacent planetary gears 33 and 40, are rotatably supported on pins 43, which have one end threaded into tapped apertures 44 in a radial flange 45 on the forward end of the sleeve 7. The third pair of planetary gears 33 and 40 is rotatably supported by means of bearings 46 on a pin 47, which has one end threaded into a block member 48. The block member 48 is disposed in a cutout portion of the sleeve flange 45 and secured to the latter by means of a key 49 and cap screws 50. As can be best seen in Fig. 4, the cap screws 50 extend downwardly through elongated apertures 51 in the block member 48 and are threadably received in the sleeve 7. The block member 48 may be adjusted transversely on the sleeve 7, in order to eliminate back lash in the differential gearing, by loosening the cap screws 50 and adjusting a pair of opposed set screws 52, which are carried in the flange of the sleeve. Due to the fact that the length of the apertures 51, in the block member 48, are greater than the diameters of the cap screws 50 it is possible to shift the block member transversely with respect to the sleeve by adjusting the set screws 52.

In order to provide ready access to the set screws, the housing 5 is provided with horizontally extending apertures 53 which are normally closed by means of plugs 54. By removing the plugs 54, a tool may be inserted through the opening 53, so as to adjust the set screws 52. After the set screws have been adjusted so as to position the block in the desired position, the block can be clamped in place by tightening the cap screws 50. This is accomplished by inserting a tool down through vertical openings 55 in the housing 5, after removing the plugs 57 therefrom, and tightening screws 50. The set screws 52 can then be removed from the sleeve so as not to project therefrom or interfere with the operation thereof, and the block will be held in the desired position, by the cap screws. Thus, by adjusting the block 48, the planetary gears 33 and 40 carried thereby will be adjusted and any backlash in the differential gearing can be removed. In this way, one pair of the planetary gears 33 and 40 is adjusted against its meshing gears and no backlash will be present in the differential gearing, which would impair the accuracy and efficiency of the entire mechanism.

When the drive shaft 11 is driven by the machine lead bar, the sun gear 29 will be rotated, thus driving the planetary gears 33, which will roll circumferentially around the ring gear 36. As the planetary gears 40 are supported on the same pins as their adjacent gears 33, the gears 40 will roll around their ring gear 41. As the ring gear 41 is normally held against rotation, as will be hereinafter described, it will not rotate and the planetary gears 40 will drive the sun gear 32 and the spindle 21 at the same speed as the drive shaft 11, and without rotating the sleeve 17.

A worm wheel 71 is keyed to the sleeve 17, forwardly of the differential gearing mechanism 31, and meshes with a cone worm 73 which is journaled in the housing 5 by means of suitable bearings 75. The cone worm 73 has a reduced end portion 77 which projects outwardly through the housing and carries an armlike member 79. The member 79 is keyed to the end of the worm shaft 77 for rotation therewith and carries, adjacent the outer periphery thereof, a pin detent 81. The pin detent is resiliently urged inwardly by a spring 83 for reception in any one of a plurality of circumferentially spaced holes 85 in an index plate 87. The index plate 87 is secured to the housing 5 by any suitable means such as screws 89. The pin detent 81 can be positioned in any one of the holes 85 and can be shifted from one hole to another by pulling it outwardly against the action of the spring 83 and rotating the arm member 79 and worm 73 until it is opposite any desired hole in the index plate 87.

When the pin detent 81 is removed from the hole in the index plate and rotated to the next desired position the cone worm 73 is likewise rotated and drives the worm wheel 71 which in turn rotates the sleeve 17. Rotation of the sleeve 17 causes rotation of the ring gear 41, which causes the planetary gears 40 to rotate about the axis of the pins 33 and 47 respectively. Thus, as the planetary gears 40 rotate about their own axes the planetary gears 33 are not rotated. The drive shaft 11 is, therefore, not rotated by the indexing mechanism, and the indexing mechanism can rotatably position the spindle 21 relative to the drive shaft 11. In the embodiment illustrated, the worm gear drive between the pin detent 81 and the spindle 21 provides a gear reduction of 60-1. Because of this large gear reduction, the necessity of employing a highly accurate index plate is eliminated and any standard, inexpensive plate may be used inasmuch as only one sixtieth of the spacing error inherent in the plate will be transferred to the spindle.

It can thus be seen that the rotating spindle 21 may be adjusted relative to the drive shaft 11 even when the drive shaft and spindle are being driven. This arrangement permits rolling of a workpiece so that wide cylindrical surfaces, such as between helical teeth, may be finished with the use of the index head of this invention. This was not possible with previous known constructions, as the spindle could not be rotated relative to the drive shaft when the latter was rotating.

While the index head of this invention is adapted primarily for use on a grinding machine where the driving speed of the shaft 11 is relatively high and where the wheel will pass over the workpiece several times in order to finish the same, it may be used on various other suitable machines. It will also be appreciated that, as the index plate is completely separated from the rotating drive shaft, there will be less tendency for the index plate to wear out and, as the plate is stationary, there will be no confusion on the part of the operator in carrying out the indexing operation. The expense of manufacturing and maintaining this index head is naturally lessened by the use of the standard index plate, and the efficiency and accuracy are enhanced by the arrangement which enables the elimination of backlash in the gear train.

What is claimed is:

1. An indexing head of the rotating spindle type, including a housing, a drive shaft rotatably supported in said housing, a sleeve member rotatably supported in said housing and axially spaced from said drive shaft, a spindle rotatably supported in said sleeve in end-to-end aligned relationship with respect to said drive shaft, sun gears carried on the adjacent ends of said drive shaft and spindle, a plurality of adjacent similarly spaced planetary gears meshing with each of said sun gears, means rotatably supporting each adjacent pair of planetary gears, means rotatably suporting said last means in said housing, a ring gear connected to said housing and meshing with the planetary gears in said drive shaft sun gear, a second ring gear connected to said rotatable sleeve and meshing with said spindle planetary gears, whereby when said drive shaft is rotated said spindle will be driven through said gearing independently of said sleeve and when said sleeve is rotated said spindle will be rotatably driven through said gearing relative to said drive shaft, and means for fixing said sleeve in any one of a plurality of rotative positions.

2. An indexing head of the rotating spindle type, including a housing, a drive shaft rotatably supported in said housing, a sleeve member rotatably supported in said housing and axially spaced from said drive shaft, a spindle rotatably supported in said sleeve in end-to-end aligned relationship with respect to said drive shaft, sun gears carried on the adjacent ends of said drive shaft and spindle, a plurality of adjacent similarly spaced planetary gears meshing with each of said sun gears, means rotatably supporting each adjacent pair of planetary gears, means rotatably supporting said last means in said housing, a ring gear connected to said housing and meshing with the planetary gears in said drive shaft sun gear, a second ring gear connected to said rotatable sleeve and meshing with said spindle planetary gears, whereby when said drive shaft is rotated said spindle will be driven through said gearing independently of said sleeve and when said sleeve is rotated said spindle will be rotatably driven through said gearing relative to said drive shaft, a rotary indexing element reduction gearing connecting said indexing element to said rotatable sleeve, and means for fixing said indexing element in any one of a plurality of rotative positions.

3. An indexing head of the rotating spindle type, including a rotatable spindle, a rotatable drive shaft, a rotatable member for use in indexing said spindle relative to said shaft, differential gearing including a plurality of interconnected gear elements, one of said elements being connected to said spindle, another of said elements being connected to said shaft, and a third of said elements being connected to said rotatable index member, whereby when said shaft is rotated said spindle will be driven through said gearing independently of said index member and when said index member is rotated said spindle will be rotatably driven through said gearing relative to said shaft, a worm wheel drivingly connected to said rotatable indexing member, an indexing element rotatably supported in said housing, a worm gear carried by said indexing element and meshing with said worm wheel, a stationary indexing plate carried by said housing, and means adjustably connecting said indexing element to said index plate in any one of a plurality of rotatable positions.

4. An indexing head of the rotating spindle type, including a housing, a sleeve rotatably supported in the rear portion of said housing, a drive shaft rotatably supported in said sleeve, a second sleeve rotatably supported in the front portion of said housing and in coaxial relationship to said first sleeve, a spindle rotatably supported in said second sleeve and in coaxial alignment with said drive shaft, sun gears carried on the adjacent ends of said driving shaft and spindle, a plurality of circumferentially spaced planetary gears meshing with said driving shaft sun gear, a plurality of similarly spaced planetary gears meshing with said spindle sun gear and disposed adjacent to said drive shaft planetary gears, pin means rotatably supporting each drive shaft planetary gear and its adjacent spindle planetary gear, said pin means being connected to said first sleeve which is rotatably supported in said housing, a ring gear connected to said housing and meshing with said drive shaft planetary gears, a second ring gear connected to said second rotatable sleeve and meshing with said spindle planetary gears, whereby when said drive shaft is rotated said spindle will be driven through said gearing independently of said second sleeve and when said second sleeve is rotated said spindle will be rotatably driven through said gearing relative to said drive shaft, a worm wheel carried by said second rotatable sleeve, an indexing element rotatably supported in said sleeve, a worm gear carried by said indexing element and meshing with said worm wheel, a stationary index plate carried by said housing, and means for adjustably connecting said indexing element to said index plate in any one of a plurality of rotatable positions.

JAMES L. JESSUP.

REFERENCES CITED

The following references are of record in the file of this patent:

UNITED STATES PATENTS

| Number | Name | Date |
|---|---|---|
| 2,002,967 | Spurr | May 28, 1935 |
| 2,330,921 | Rickenmann | Oct. 5, 1943 |

FOREIGN PATENTS

| Number | Country | Date |
|---|---|---|
| 605,164 | Germany | Nov. 8, 1934 |